July 14, 1953  S. JAKSEKOVICH  2,645,203

COWTAIL SUSPENDER

Filed June 27, 1950

Stephen Jaksekovich
INVENTOR.

BY

Patented July 14, 1953

2,645,203

UNITED STATES PATENT OFFICE 2,645,203

COWTAIL SUSPENDER

Stephen Jaksekovich, Kewaunee, Wis.

Application June 27, 1950, Serial No. 170,570

8 Claims. (Cl. 119—105)

This invention relates to new and useful improvements in cow tail suspenders and the primary object of the present invention is to provide a device that will permit free and natural movement of a cow's tail but which will prevent a cow's tail from entering the usual gutter at the rear of a stall in lying position and which also embodies a means for holding a cow's tail raised to prevent hindrance to a milker by means of the modification as shown in Figure 2.

Another important object of the present invention is to provide a cow tail suspender including a flexible hanger that is attached to a ring concealed within a cow's tail and which will permit the cow to swing its tail, a natural reaction, without permitting the cow to swing its tail in lying position into a gutter located at the rear of the cow that frequently conducts contagious disease normally harming the health of cows and/or the milk they produce.

The hygienic cow tail suspender completely cuts any contact of the tail with the gutter and prevents its contamination by the content of the gutter. It makes the separation of cows almost complete and summing up it (a) saves an enormous amount of work to keep cows clean (b) thereby increases hygienic conditions in the barn in general and especially the hygiene of the milk (c) is able to decrease the spread of brucellosis to an important degree while the cows are in barn (d) and is also able to decrease the mastitis infection through its sanitary improvement.

A further object of the present invention is to provide a cow tail suspender of tested ability that anticipates the normal habits of cows and which provides comfort for cows as well as indirect safety for milk consumers and milk handlers.

A still further aim of the present invention is to provide a cow tail suspension device that is simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
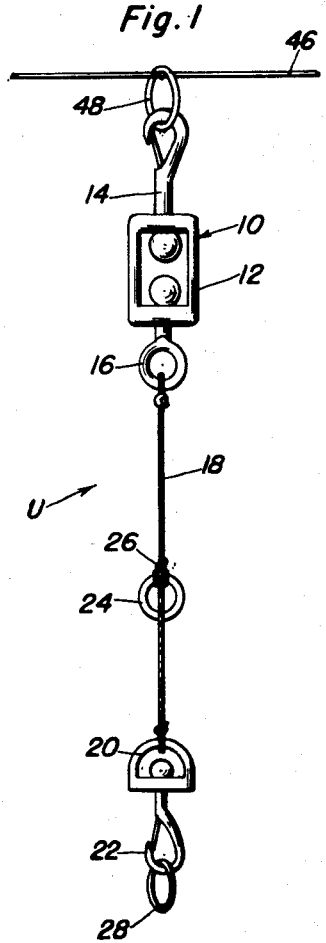
Figure 1 is an elevational view of the present invention.

Referring now to the drawings in detail, wherein for the purpose of illustration, there is disclosed a preferred embodiment of the present invention, the numeral 10 represents a swivel member including a hollow substantially rectangular block 12 of lightweight material, such as aluminum, the upper end of which rotatably supports an upstanding vertical spring clip or attaching hook 14. The lower end of the block 12 rotatably supports a depending eye or ring member 16.

The upper end of a flexible hanger or cord 18 is attached to the eye member 16 and the lower end of the cord 18 is attached to a yoke 20 that rotatably supports a lower spring clip or fastener 22.

Figure 2:
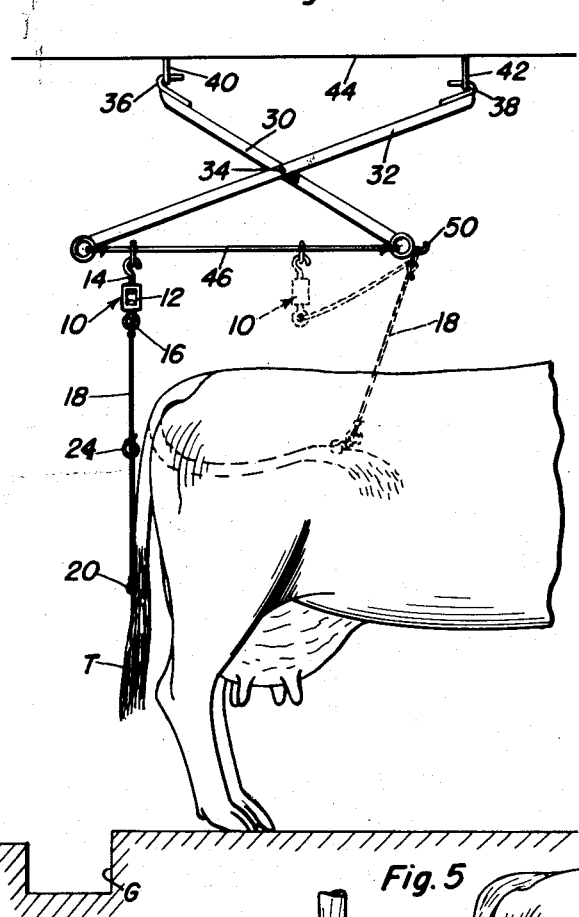
Figure 2 is a side view on reduced scale of the present invention in use in this modification with the linkage employed for an individual cow and with dotted lines showing the manner in which a cow's tail is supported during the milking operation.

A holding ring 24 is secured, as at 26, to the cord 18 intermediate the ends of the cord and is employed when the cow's tail is to be held raised during the milking operation as shown in Figure 2. The ring 24 is of lightweight material, such as plastic or aluminum.

Figures 4, 5:
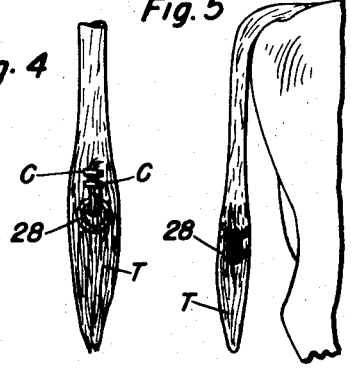
Figure 4 is a view showing one method of anchoring the device to a cow's tail; and, Figure 5 is a view showing another method for anchoring the device to a cow's tail.

The clip 22 is detachably secured to an anchor ring 28. The anchor ring 28 is held concealed within the tip of a cow's tail T by either a pair of spring clips C or by tying a lock of the tail T with the ring 28, as shown in Figures 4 and 5 respectively. It is intended that the ring 28 remain concealed in the cow's tail when the clip 22 is disengaged with the ring 28.

Attention is directed to Figure 2 wherein there is disclosed the present invention in use for holding a cow's tail through the medium of a pair of crossed links 20 and 32. The links are joined at their point of intersection by a horizontal pivot 34 and the upper ends of the links 30, 32 terminate in hooks 36 and 38 that engage eyes 40 and 42 depending from a ceiling 44. The lower eye ends of the links 30, 32 are connected by a guide or cord 46 on which there is slidably received a guide ring 48. The ring 48 engages the clip 14.

The links 30 and 32 are disposed longitudinally of a cow and above the rear end of a cow, as shown in Figure 2, with the link 32 longer than the link 30 and with the lower end of the link 32 above a gutter G. Also, the lower end of the link 30 supports a hook 50 over which the ring 24 is placed to hold the tail T in a raised position so that the cow cannot swing its tail into the face of a milker. This is shown by dotted lines in Figure 2.

Figure 3:
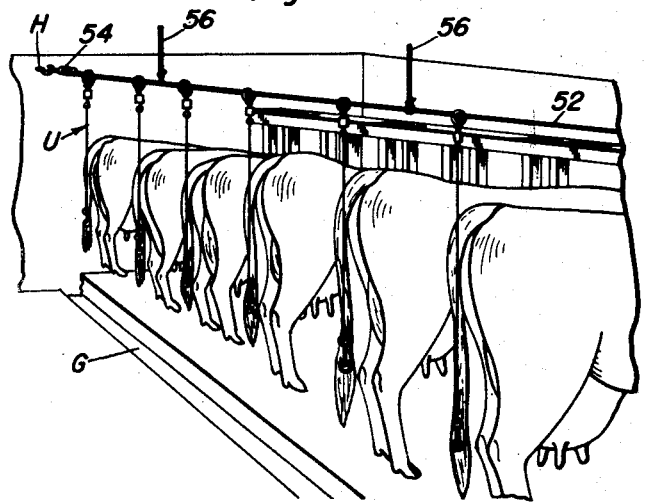
Figure 3 is a diagrammatic perspective view showing the present invention in use for holding the tails of a group of cows.

Figure 3 illustrates a horizontal guide 52 that is terminally attached to wall hooks H by turnbuckles 54 and which is further supported by hangers 56. The guide 52 extends transversely across a plurality of stalls and above the gutter G and slidably supports a plurality of the units U. Furthermore, should the cow to which the invention is attached attempt to kneel its tail will not enter the gutter since the hanger will retain the cow's tail raised.

The holding rings 24 are not employed with the hooks 50 in the units U shown in Figure 3 although the units U function to retain the cows' tails raised and away from the gutter both when the cows are lying and standing. However, it does not make possible the fixation of the tail during milking as it is possible in the modification shown in Figures 1 and 2 by the use of the ring 24, in connection with the hook 50.

Having described the invention, what is claimed as new is:

1. A cow tail suspender comprising a swivel member including an attaching hook, a guide slidably supporting the hook, a flexible element depending from the swivel member, means supported on the flexible element for attaching the flexible element to a cow's tail, a holding ring carried by said element, means associated with said guide and receiving the ring to hold the tail of a cow raised, and means supporting the flexible element extended and adapted to be suspended from a ceiling, said ring receiving means forming part of said supporting means.

2. A cow tail suspender comprising a guide, a member slidably received on said guide, a flexible hanger attached to said member, means at the lower end of said hanger for attaching the hanger to a cow's tail, a holding ring carried by said hanger, means associated with the guide for receiving the ring to hold a cow's tail in a raised position, and a collapsible frame adapted to be suspended from a ceiling and supporting the guide, said ring receiving means forming a rigid part of said frame.

3. A cow tail suspender comprising a hollow block, a clip rising from the block and rotatably supported by the block, a ring member rotatably supported by and depending from the block, a flexible hanger attached to the ring member, means at the lower end of said hanger for detachably securing the hanger to a cow's tail, a holding ring carried by said hanger intermediate the ends of said hanger, a flexible guide, a guide ring slidably received on said guide and attached to said clip, means associated with said guide for receiving said holding ring, and a collapsible frame adapted to be suspended from a ceiling and supporting the guide in an extended position, said holding ring receiving means being rigidly attached to and forming a part of said frame.

4. The combination of claim 3 wherein said frame includes a pair of crossed links, a pivot joining said links at their point of intersection, each of said links including a lower end, and said guide comprising a cord terminally attached to the lower ends of said links and slidably supporting said guide ring.

5. The combination of claim 4 and a hook at the lower end of one of said links and comprising said holding ring receiving means.

6. The combination of claim 3 wherein said means for detachably securing the hanger to a cow's tail includes an anchor ring, and clips carried by said anchor ring for gripping the hairs of a cow's tail and for concealing the anchor ring within a cow's tail.

7. A cow tail suspender comprising a pair of crossed links pivotally connected together at their point of crossing, each of said links having an upper end and a lower end, hooks at the upper ends of said links adapted to engage a pair of spaced eye members secured to a ceiling, a flexible guide terminally secured to the lower ends of said links and adapted to be held taut when the hooks are engaged with a pair of spaced eye members depending from a ceiling, a flexible hanger slidably carried by the guide for attachment to a cow's tail, and means on the lower end of one link for engaging the hanger to hold the latter raised.

8. A cow tail suspender comprising a pair of crossed links pivotally connected together at their point of crossing, each of said links having an upper end and a lower end, hooks at the upper ends of said links adapted to engage a pair of spaced eye members secured to a ceiling, a flexible guide terminally secured to the lower ends of said links and adapted to be held taut when the hooks are engaged with a pair of spaced eye members depending from a ceiling, a flexible hanger slidably carried by the guide for attachment to a cow's tail, said hanger being elongated and including a ring intermediate its ends, and a hook on the lower end of one link adapted to receive the ring to hold the hanger raised.

STEPHEN JAKSEKOVICH.

References Cited in the file of this patent

UNITED STATES PATENTS

| Number | Name | Date |
|---|---|---|
| 255,233 | Andrus et al. | Mar. 21, 1882 |
| 1,887,491 | Johnson | Nov. 15, 1932 |

FOREIGN PATENTS

| Number | Country | Date |
|---|---|---|
| 11,902 | Denmark | Feb. 23, 1909 |